US007926188B2

(12) United States Patent
Thorkelson

(10) Patent No.: US 7,926,188 B2
(45) Date of Patent: Apr. 19, 2011

(54) SYSTEM AND METHOD FOR CREATING PURPORTIONATELY ACCURATE FIGURES

(76) Inventor: Gregg B. Thorkelson, Saint Anthony, ID (US)

( * ) Notice: Subject to any disclaimer, the term of this patent is extended or adjusted under 35 U.S.C. 154(b) by 12 days.

(21) Appl. No.: 12/361,523

(22) Filed: Jan. 28, 2009

(65) Prior Publication Data

US 2009/0211104 A1 Aug. 27, 2009

Related U.S. Application Data

(60) Provisional application No. 61/024,194, filed on Jan. 28, 2008.

(51) Int. Cl.
*G09B 11/04* (2006.01)
*B43L 13/00* (2006.01)

(52) U.S. Cl. .......................................... 33/1 K; 33/18.3

(58) Field of Classification Search .................... 33/1 K, 33/1 B, 1 BB, 18.3
See application file for complete search history.

(56) References Cited

U.S. PATENT DOCUMENTS

| | | | | |
|---|---|---|---|---|
| 0,275,822 | A | 4/1883 | Hagan | |
| 464,359 | A * | 12/1891 | Hagan | 33/1 R |
| 752,617 | A * | 2/1904 | De Pue | 33/1 A |
| 1,622,229 | A * | 3/1927 | Ormiston | 33/1 K |
| 1,679,927 | A | 8/1928 | Bell | |
| 3,660,903 | A * | 5/1972 | Caperton, Jr. | 33/276 |
| 4,001,941 | A * | 1/1977 | Cruz | 33/1 K |
| 4,498,238 | A | 2/1985 | Vaughn | |
| 4,823,476 | A * | 4/1989 | Curtin | 33/512 |
| 5,174,037 | A * | 12/1992 | Curtin | 33/512 |
| 5,636,461 | A | 6/1997 | Shewmaker | |
| 5,673,490 | A | 10/1997 | Hill | |
| 6,568,938 | B1 | 5/2003 | Prince | |
| 6,579,099 | B1 | 6/2003 | Pipes | |
| 7,325,325 | B2 | 2/2008 | Gleeson | |
| 7,389,589 | B2 | 6/2008 | Debold | |
| 7,401,410 | B1 * | 7/2008 | Jewell | 33/1 K |
| 7,464,480 | B2 * | 12/2008 | Vetromila | 33/436 |

* cited by examiner

*Primary Examiner* — Christopher W Fulton
(74) *Attorney, Agent, or Firm* — Eric M. Barzee

(57) ABSTRACT

A system and method for producing proportionately accurate likenesses in an artwork is presented. The system uses a grid or other distance markers on a transparent surface of a card. By observing a measurement of a feature of a subject with the distance markers and transcribing the measurement of the feature on the artwork an accurate likeness of the subject may be made.

18 Claims, 5 Drawing Sheets

SYSTEM AND METHOD FOR CREATING PURPORTIONATELY ACCURATE FIGURES

RELATED APPLICATIONS

This Patent Application claims priority to the U.S. provisional patent application Ser. No. 61/024,194 entitled "SYSTEM AND METHOD FOR CREATING PROPORTIONATELY ACCURATE FIGURES" filed on Jan. 28, 2008 which is incorporated in its entirety by reference and made a part hereof.

BACKGROUND OF THE INVENTION

1. Field of the Invention

The present invention relates to the field of tools and methods for creating works of art. More particularly the present invention relates to a system and method for creating a proportionally accurate likeness of a subject in an artwork.

2. State of the Art

Many artists are skilled in the various mediums of art. They may create unique and beautiful works of art such as drawings, paintings, or sculptures. In many of these artworks a realistic portrayal of the person, object or other subject is desirable.

However, despite the artist's skill and desire in working in his selected medium, it remains difficult even for the experience professional to consistently create a good likeness between a real life subject, whether a person, animal, still life, or landscape, and the image that appears in the artwork. This is particularly true when an artist sets out to create a portrait of a human subject. In this instance even a slight change in, for example, the size of the eyes, location of the ears, puffiness of the cheeks, location of wrinkles, or shape of the face might produce a poor likeness of the subject in an otherwise faultless piece of art.

The difficulty with producing a good likeness can be true of any artwork from a simple pencil drawing, to the most complex oil painting or sculpture. In fact it is one of the major difficulties that has plagued artists from the beginner to the seasoned master for countless generations.

Many devices have been created to assist an artist in creating a realistic likeness of a subject. For example the devices disclosed in U.S. Pat. Nos. 5,673,490; 6,568,938; 6,579,099; 7,389,589 have been developed to purportedly assist artists in creating better likenesses of their subjects.

However, each of these devices suffers from a variety of limitations. For example the device disclosed in U.S. Pat. No. 5,673,490 uses a grid system on a static cling surface that can be attached to a light box or similar tracing aid. This device merely uses a grid to facilitate tracing of a photograph or other print and cannot be used to view landscapes, still life, or live models directly. Similar limitations are found in the devices disclosed in U.S. Pat. Nos. 6,568,938; 6,579,099; and 7389,569 each of which uses a variation of gridding and tracing to allow artists to copy or trace their subject. Further many of these devices require that the artwork itself be gridded. The gridding of the artwork introduces another step at which a mistake can be made resulting in a distorted and not accurate portrayal of the subject in the artwork.

While it is true that copying, gridding, and tracing help artists create a realistic likeness of their subjects, tracing does not teach the artists to view the entire subject and transfer their impression of model to the artwork. Rather it forces the artist to concentrate on a small portion of the model and copy that small portion. Small differences between the copied and traced sections may add up over the whole artwork to create an unrealistic rendering of the subject. Further, copying and tracing are generally perceived as novice methods by experienced and professional artists who could also benefit from a tool that assists them in perceiving and drawing a subject in accurate proportions.

BRIEF SUMMARY OF THE INVENTION

A system for creating a proportionately accurate likeness of a subject in an artwork is presented. The system includes a card having at least a portion of which is a transparent surface through which the subject may be viewed. The transparent surface has a grid created from a series of equally spaced vertical lines and a series of equally spaced horizontal lines intersecting at approximately right angles. The grid allows a user of the system to view the subject and to measure the features of the subject. Distance identifiers may be placed on the card and/or transparent surface to aid an artist in measuring the features of the subject. The distance identifiers may be positioned adjacent the end point of the vertical and horizontal lines along one or more margins of the grid. Such distance markers may be numbers, roman numerals, etc.

Set indicators may also be on the transparent surface indicating a grouping or set or grid lines. For example the distance identifier and/or grid line may be bolded at a predetermined interval such as every 3, 4, 5 or 10 lines.

The system also includes a plurality of rulers, separate from the card with the transparent surface, for proportionately transferring the measurement of the features to a working surface of the artwork. Each ruler has a set of distance equally spaced distance markers. The distance markers on each ruler within the plurality of rulers may be incrementally larger or smaller than the distance markers on another ruler within the plurality. In one embodiment the plurality of rulers is imprinted on a single tape. The rulers on the tape have distance markers on the ranging from about one-third of an inch to about three inches. The distance markers on different rulers may increase incrementally in about one-sixteen of an inch increment from about three-eighths to about three inches. A caliper can be provided to assist in proportionately transferring measurement of the feature to the working surface of the artwork.

In certain embodiments, the card may be hand held by a user. Alternatively attachment means such as a clip, tripod, fasteners, Velcro, glue, and the like, may be used to fix the card in a desired position at which the artist can view the subject through the grid. A positionable clip may be attached to the card and to a surface adjacent the working surface of the artwork. A user may thus adjust the position of the card to optimize view of the subject through the grid for measuring the features of the subject.

The card may include distance markers in one or two dimensions. In certain embodiments, the transparent surface may have a plurality of equally spaced distance markers arranged in a column on the transparent surface for measuring features of the subject. These distance markers may be proportionate cells arranged in a column. Distance identifiers such as numbers may be positioned near each cell or distance marker for ease of measurement. A plumb indicator line may be provided for the user to determine the relative horizontal and vertical positions of features of the subject.

The present invention also relates to methods of using the system to create proportionately accurate renditions of a subject in an artwork. The method includes viewing the subject through a card having a transparent surface with a plurality of equally spaced distance marker. A user views a feature of interest, and with the distance markers, measures a dimension of the feature.

After the feature is measured, the user transfers the measured dimension of the feature to the working surface of the artwork. To transfer the measurement, a user may use a ruler having equally space distance markers. The ruler may part of a set of rulers on a single tape. For working convenience, the ruler may be removably attached to the working surface of the artwork. The distance between the markers may be smaller or larger than the distance between the distance markers or cells on the transparent surface of the card. The user may count or calculate the same number of measured units and place a marker such as the prongs of a caliper on the counted marks of the ruler. This proportionally enlarged or reduced dimension is then transferred to the working surface of the artwork by placing the caliper prongs on the artwork. The user may also use a measured first dimension of a feature of the artwork as a base measurement for measuring the size and position of other features of the subject.

The card or its transparent surface may also include a plumb indicator line. In such instances, the method may also include viewing the subject through the transparent surface with the plumb indicator line in a substantially horizontal or vertical orientation with respect to a first feature of the subject, observing the relative horizontal or vertical location of a second feature of the subject and transferring the second feature to the working surface of the artwork at the observed relative position from the first feature.

DETAILED DESCRIPTION OF THE INVENTION

Figure 1:
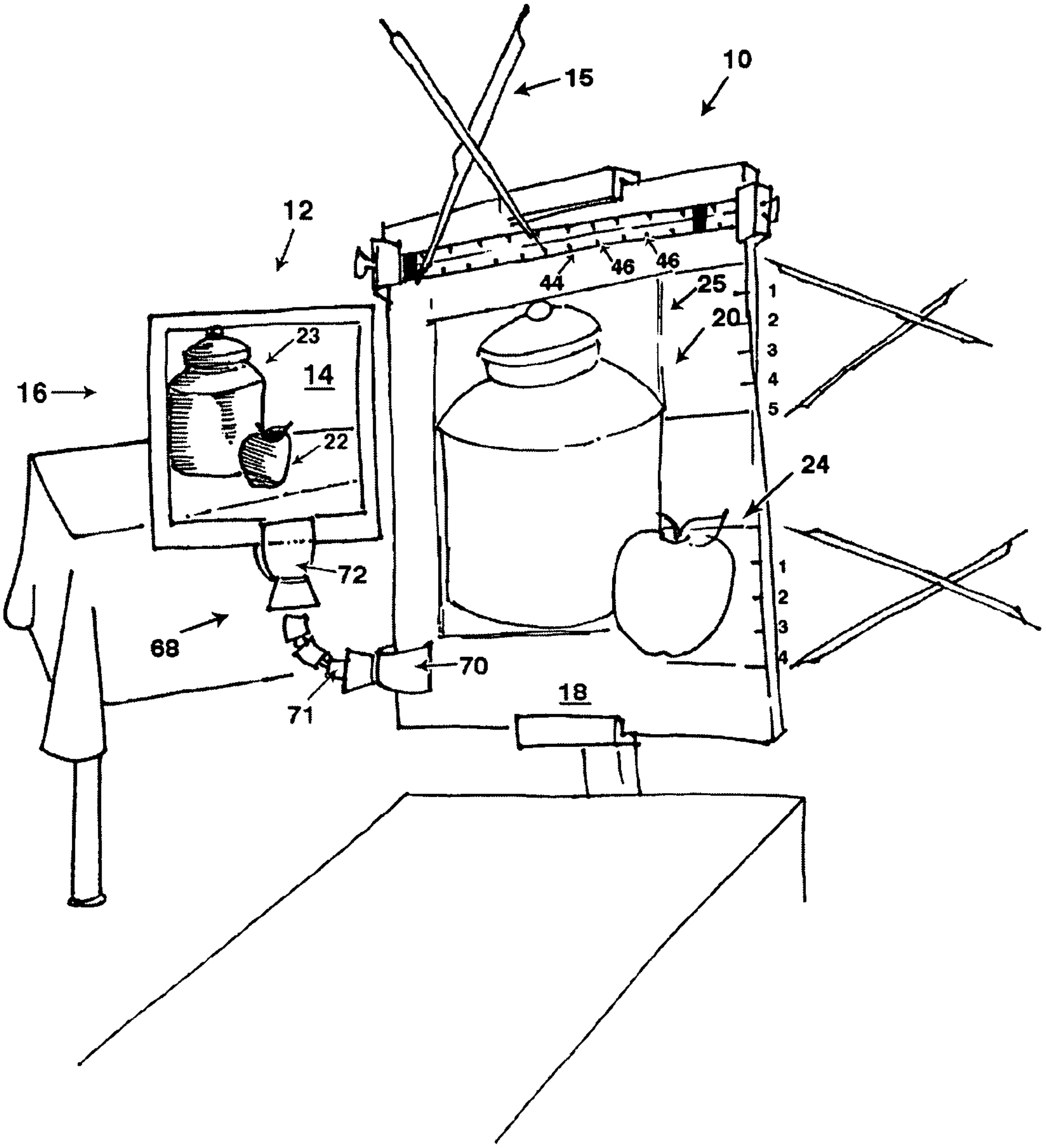
FIG. 1 is a perspective view of one embodiment of system for creating a proportionately accurate likeness of a subject in an artwork as disclosed herein.
Figure 2:
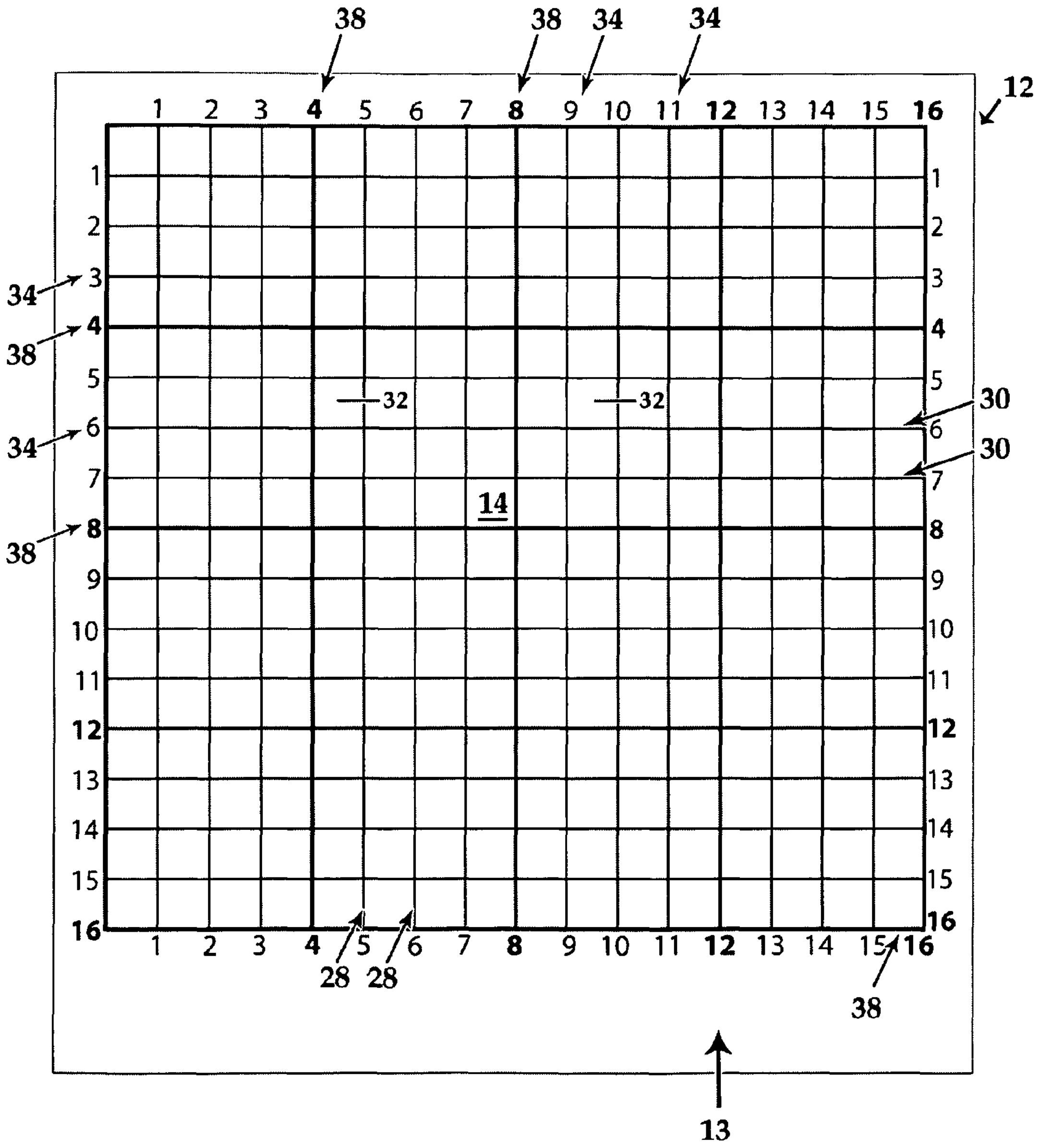
FIG. 2 is a perspective view of one embodiment of a card having a see-through surface of the system of FIG. 1.
Figure 3:
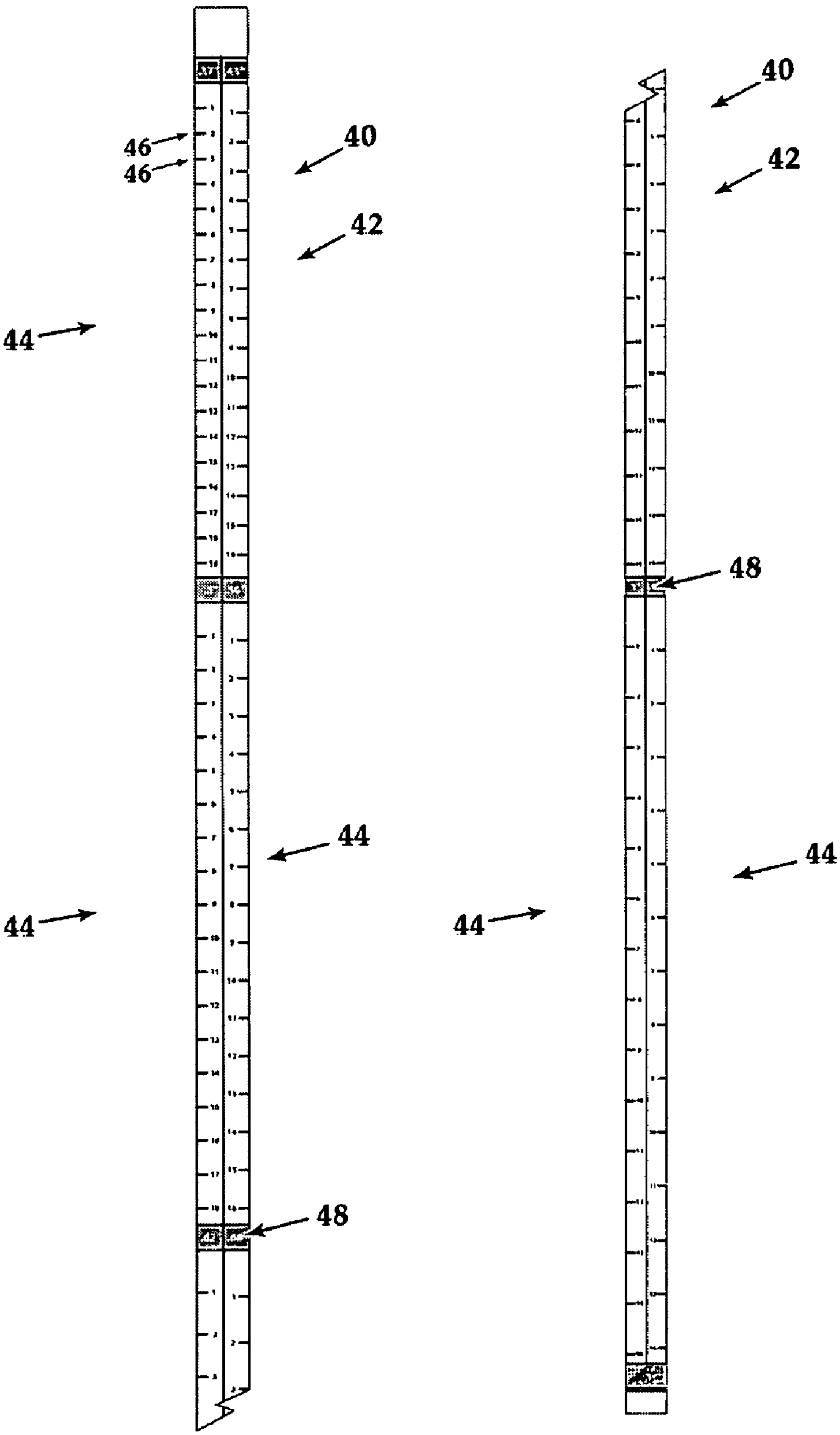
FIG. 3 is a perspective view of one embodiment of the plurality of rulers as part of the system of FIG. 1.
Figure 4:
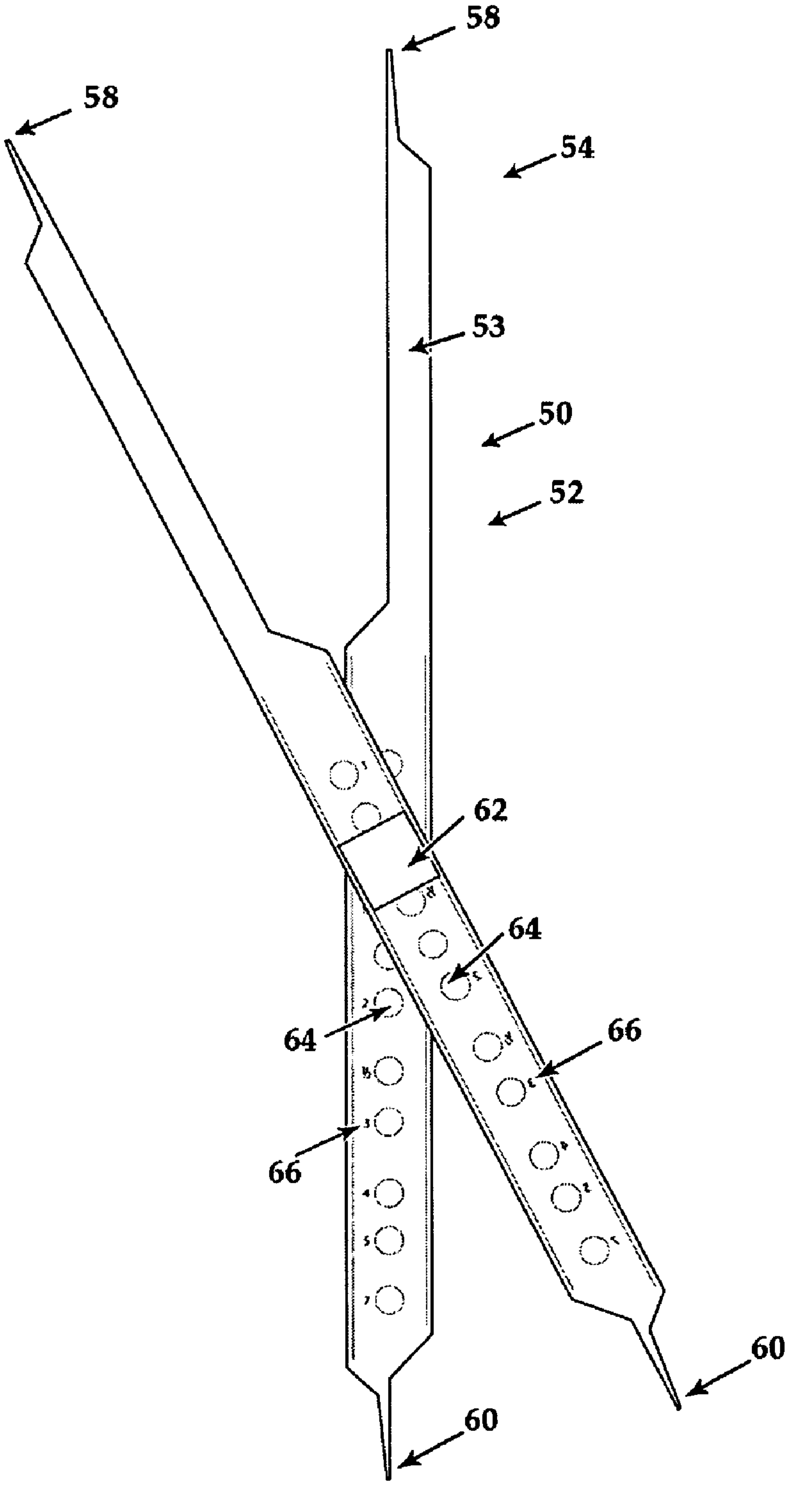
FIG. 4 is a perspective view of one embodiment of a caliper that may be used with the system of FIG. 1.

Before the present system and methods of use thereof for producing an accurate likeness are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be determined by the appended claims and equivalents thereof.

As used herein, "comprising," "including," "containing," "characterized by," and grammatical equivalents thereof are inclusive or open-ended terms that do not exclude additional, unrecited elements or method acts.

As used herein, "about" or means reasonably close to, a little more or less than the stated number or amount, or approximately.

As used herein, "exemplary" means serving as an example of. The use of the term "exemplary" herein in connection with a particular embodiment is not to be construed as the particular embodiment being preferred over any other embodiment.

Referring to FIGS. 1-4 an exemplary embodiment of a system for creating a proportionately accurate likeness of a 36 on an artwork 38 is presented. The system includes a card 12 having a transparent surface 14. The transparent surface 14 may be an integral part of the card 12 or may be attached to a border made from a non-transparent material. As used herein, transparent refers to a state that is generally see-through so that an artist may see a subject 16 through the surface 14 in sufficient detail to transcribe the artist's impression of the subject 16 on the artwork 18. The transparent surface 14 may be made of any of a variety of materials such as glass, plastic, quartz, crystal, paper, waxed paper, oiled paper, screen, and other similar see-through materials. It will be appreciated that the material may be tinted or treated to reduce glare or enhance the artist's view of the subject 16 as he looks through the surface 14. The dimensions of the card 12 and its transparent surface 14 may vary. However, in certain present embodiments the card 12 may have a first dimension of about 1 inch to about 20 inches and a second dimension of about 1 inch to about 20 inches. For example the card 11 may have dimensions of about 1 by about 6 inches, about 2 by about 3 inches, about 3 by about 5 inches, about 3.5 by about 5 inches, about 4 by about 6 inches, about 8 by about 10 inches, about 5 by about 7 inches, about 6 by about 6.5 inches, or about 8.5 by about 11 inches.

Horizontal lines 30 and vertical lines 28 may be printed, drawn, etched or otherwise disposed on the transparent surface 14 to create a grid 26 with the vertical lines 28 and horizontal lines 30 intersecting at about right angles. These intersecting lines 28, 30 create cells 32 that are substantially square having about the same top, bottom, and side dimensions. Distance identifiers 34 along the top, bottom, and/or sides of the card 12 or surface 14 may assist the artist in distinguishing between the grid lines 28, 30. Additionally the distance identifiers 34 can be used to aid the artist in measuring a dimension of a feature 22 of the subject 16. Distance identifiers can be numbers, roman numerals, or other identifiers that would assist artists in readily determining the length or width of the feature 22. The horizontal and vertical lines 28, 30 may also function as plumb indicator lines 38 to assist the artist in determining the relative horizontal and vertical positions of features of the subject.

Set identifiers 38 are also provided to assist the artist in rapidly measuring the desired dimension of a feature. For example in the illustrated embodiment, every forth horizontal and vertical grid line 28, 30 is bolded or highlighted. This emphasis on the set of four grid lines 28, 30 allows the artists to identify groups of lines without counting or referring to the distance identifiers 24. In certain embodiments, the set identifiers are placed on the grid 26 at a repeating interval of every 3, 4, 5, or 10 grid lines 28, 30.

A plurality of pre-marked rulers 40 may also be provided separate from the card 12 having a transparent surface. The set of rulers 40 includes one or more rulers 44 having evenly space distance markers 46. The set of rulers 40 may have a number of separate rulers or may include a tape 42 with one or more rulers printed thereon. The tape 42 may have rulers printed on both the left and right sides and on the front and back. The spacing of the distance markers 44 on each ruler 44 can be indicated in a legend 48 on the ruler 44. The spacing of the distance 46 markers on each ruler 44 is the same on that ruler 44. However, the spacing of distance markers 46 on each different ruler 44 of the set of rulers 40 vary. For example first ruler 44 may have distance markers 46 having a uniform spacing of about 1 inch and a second ruler 44 may have distance markers having a uniform spacing of about 1.25 inches. The distance markers on the rulers within the set 40 may increase incrementally from about one-third of an inch to about three inches or larger. For examples, the distance markers 46 on separate rulers 44 may increase incrementally in about one-sixteen of an inch increment from about three-eighths to about five inches.

A caliper 50 can be provided to assist in proportionately transferring the measurement of the feature to the working surface 18 of the artwork. The caliper 50 may be any type of caliper including the illustrated proportional divider 52. After the artists measures the dimension of a desired feature 22 or the subject 16, the caliper 50 can be opened to a corresponding number of units of the ruler 44. For example if the artist observes that a feature 22 of the subject 16 has a height of approximately 4 units as viewed through the grid 26, the artist then opens the prongs 58 of the caliper to distance of 4 distance markers 46 using the ruler 44. Using the opened caliper 50, the artist may measure the height of the feature 22 and then create a likeness 24 of the feature 20 in the artwork 18. This technique can be used to measure and transfer all features of the model to the likeness 20 in the artwork. Additionally, an artist may observe by measuring that a dimension of a second feature 25 is about twenty-five percent larger than the first feature 24. The artist may use this observation to use the measured dimension of the first feature 24 as a base measurement and then increase the opening of the caliper by twenty-five percent to create the likeness of the second feature 25 in the artwork. This method can be used both to create the rough sketch of the artwork and to check dimensions and proportionally as the artwork progresses. While the illustrated subject is a still life, it will be appreciated that the system and method of the present invention call be used with all types of subjects including, landscapes, wild life, portraits, and the like.

The card 12 may be configured to be held in the hand of the artist. Accordingly, the bottom margin 13 of the card may extend beyond the grid 26 so that the hand of the artist does not interfere with his view of the subject 16.

Alternatively the card 12 can be configured to be secured to a fixed attachment device 68. By attaching the card 12 to a secured attachment device 68, the artist can adjust the position and angle of the card 12 for optimal viewing of the subject 16. Likewise, when the card 12 is in a fixed location, the artist does not have to be concerned with relative distance of the card 12 to the subject 16 which can affect measurements. To prevent distortion of the measurements of features 22, the artist may wish to position the card 12 so that the transparent surface 14 is approximately perpendicular to the artist's line of sight. The artist can also mark the position of the subject on the transparent surface 14 so that the artist may make the measurements of the subject while in approximately the same position.

In the illustrated embodiment, the attachment device 68 includes a first clamp 70 attached near the working surface of the artwork 18. The clamp 70 is joined to a second clamp 72 by an articulated arm 71. The arm 71 allows the second clamp 72 to be positioned and rotated as desired by the artist. The second clamp 72 holds the card 12 in a position where the artist may view the subject through the grid 26. Alternatively the attachment device can include tripods, clips, Velcro, glue, or other devices that hold the card in the desired location.

The proportional divider 52 has first prongs 58 adjacent a first end 52 and prongs 60 adjacent a second end 56. A removable pivot 62 is place in one of a set of holes 64 on both pieces 51, 53 of the divider. The holes are positioned so that when the prongs 58 on first end are opened the prongs 60 of the second end are opened to a predetermined fraction. For example if the pivot 62 is placed in the hole with a proportion marker 66 of 2, the first prongs will be opened twice as far as the second prongs 60. The proportional divider 52 can thus be used when an artist desires to use a measurement of a feature 22 as a base measurement.

Figure 5:
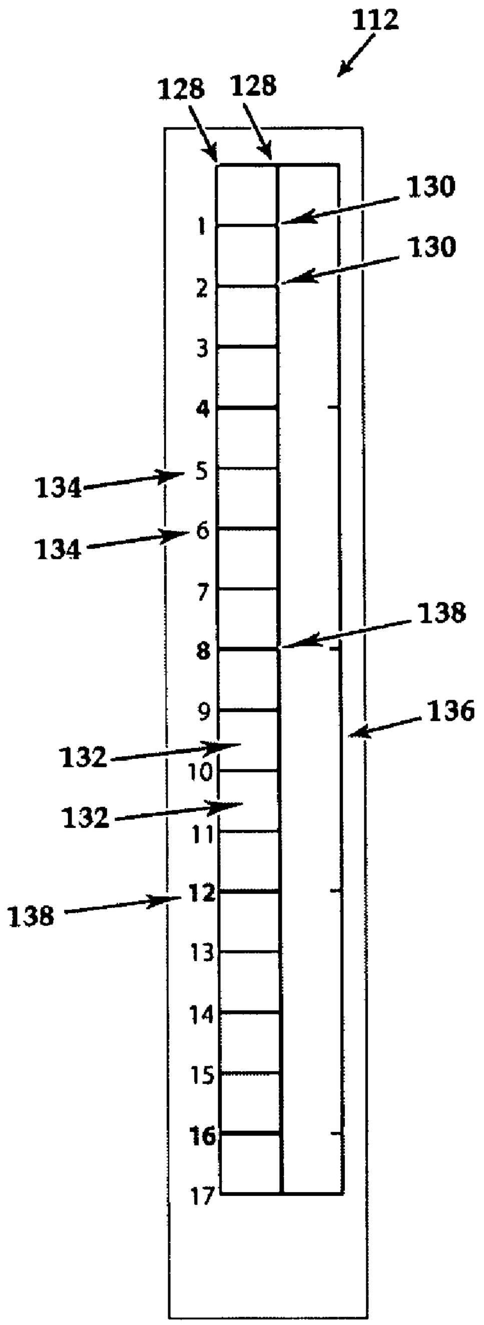
FIG. 5 is a perspective views of alternative embodiments of card having a see-through surface that can be used with the system of FIG. 1.

Referring now to FIG. 5 with continued reference to FIGS. 1-4 an alternative embodiment of the card 112 for use with the system of the present invention is show is shown. The card 112 has vertical lines 128 that intersect at approximately right angles with horizontal lines 130 to form cells 132. The cells 132 form a set of distance markers 132 in a single column. The transparent surface 114 may be an integral part of the card 112 or may be attached to a border made from a non-transparent material. As used herein, transparent refers to a state that is generally see-through so that an artist may see a subject 16 through the surface 114 in sufficient detail to transcribe the artist's impression of the subject 16 on the artwork 18. The transparent surface 114 may be made of any of a variety of materials such as glass, plastic, quartz, crystal, paper, waxed paper, oiled paper, screen, and other similar see-through materials. It will be appreciated that the material may be tinted or treated to reduce glare or enhance the artist's view of the subject 16 as he looks through the surface 114. The dimensions of the card 112 and its transparent surface 114 may vary depending. However, in certain present embodiments the card 112 may have a first dimension of about 1 inch to about 3 inches and a second dimension of about 4 inches to about 15. For example the card 11 may have dimensions of about 1 by about 6 inches.

Horizontal lines 130 and vertical lines 128 may be printed, drawn, etched or otherwise disposed on the transparent surface 114 to create a grid 126 with the vertical lines 128 and horizontal lines 130 intersecting at about right angles. These intersecting lines 128, 130 create cells 132 that are substantially square having about the same top, bottom, and side dimensions. Distance identifiers 134 along the top, bottom, and/or sides of the card 112 or surface 114 may assist the artist in distinguishing between the grid lines 128, 130. Additionally the distance identifiers 134 can be used to aid the artist in measuring a dimension of a feature 22 of the subject 16. Distance identifiers can be numbers, roman numerals, or other identifiers that would assist artists in readily determining the length or width of the feature 22.

Set identifiers 138 are also be provided to assist the artist in rapidly measuring the desired dimension of a feature. For example in the illustrated embodiment, every forth horizontal grid line 30 is bolded or highlighted. This emphasis on the set of four grid lines 130 allows the artist to identify groups of lines without counting or referring to the distance identifiers 124. In certain embodiments, the set identifiers are placed on the grid 126 at a repeating interval of every 3, 4, 5, or 10 grid lines.

The card 112 may also include a plumb indicator line 138 to assist the artist in determining the relative horizontal and vertical positions of features of the subject.

Referring now to FIGS. 1-5 a method of using the system 10 of the present invention is described. The system 10 of the invention can be used to crate proportionately accurate renditions of a subject 16 in an artwork 18. The card 12 of the invention is positioned so that an artist can view the transparent surface 14 of the card. The artist may position the card 12 in a fixed location by using an attachment device 68. The artists can move the articulating arm 71 of the attachment device until at least a portion of the subject 16 is seen within the grid 26 of the card 12.

The distance markers such as vertical and horizontal lines 28, 30 can be used to determine the size of a feature of interest 22 in the subject 16. The units of measurement of the distance markers 28, 30 are not needed to transfer the measurement to the artwork 18. For example if the artist observes that a feature 22 such as an apple in a still life has a height of about 4 units, a corresponding 4 units may be measured on a ruler 44 having equally space distance markers 46. For working convenience, the ruler 44 may be removably attached to the working surface of the artwork 18. However, it will be appreciated that the ruler can be placed anywhere that it is convenient for the artist. The distance between the markers 46 on the ruler 44 may be smaller or larger than the distance between the distance markers 28, 30 or cells 32 on the transparent surface 14 of the card 12. The artist may count or calculate the same number of measured units and place a marker such as the prongs of a caliper 50 on the counted marks 26 of the ruler 44. This proportionally enlarged or reduced dimension is then transferred to the working surface of the artwork by placing the caliper prongs 58 on the artwork. The user may also use a measured first dimension of a feature of the artwork as a base measurement for measuring the size and position of other features of the subject. Each time the artist views the subject through the grid, he can position himself so that the feature used as the base feature returns to the original position on the grid. From there he can calculate the relative dimensions of the other desired features of the subject.

The card 12 or its transparent 14 surface may also include a plumb indicator line 38, 138. In such instances, the method may also include viewing the subject through the transparent surface 14 with the plumb indicator line 38, 138 in a substantially horizontal or vertical orientation with respect to a first feature of the subject, observing the relative horizontal or vertical location of a second feature of the subject and transferring the second feature to the working surface of the artwork at the observed relative position from the first feature.

The invention claimed is:

1. A system for creating a proportionately accurate likeness of a subject in an artwork comprising:

a card comprising a transparent surface for viewing the subject, the surface having a grid comprising a series of equally spaced vertical lines and a series of equally spaced horizontal lines for measuring a feature of the subject; and a plurality of rulers, separate from the card, for proportionately transferring a measurement of the feature to a working surface of the artwork, each ruler comprising a set of distance markers, the distance between adjacent markers on each ruler being equal.

2. The system of claim 1, wherein the transparent surfaces further comprises distance identifiers adjacent the end point of the vertical and horizontal lines along one or more margins of the grid.

3. The system of claim 1, wherein the transparent surface further comprises a plurality of set indicators for identifying a predetermined set of equally spaced horizontal or vertical lines.

4. The system of claim 3, wherein the set indicators occurs at a repeating interval selected from the group consisting of 3, 4, 5 and 10.

5. The system of claim 1, wherein the plurality of rulers comprises a flexible tape having the plurality of rulers imprinted thereon.

6. The system of claim 1 further comprising a caliper for proportionately transferring a measurement of the features to a working surface of the artwork.

7. The system of claim 1 further comprising an attachment means for holding the card in a position at which the subject may be seen by user of the system through the transparent surface.

8. A system for creating a proportionately accurate likeness of a subject in an artwork comprising:

a card comprising a transparent surface for viewing the subject;

a plurality of equally spaced distance markers arranged in a column on the transparent surface for measuring features of the subject;

a plumb indicator line disposed on the transparent surface; and a plurality of rulers, separate from the card, each ruler comprising a set of distance markers, the distance between adjacent markers in single set of distance markers being equal.

9. The system of claim 8, wherein the distance markers are proportionate cells arranged in a column.

10. The system of claim 8, further comprising distance identifiers.

11. The system of claim 8, wherein the set of rulers comprises a flexible tape.

12. The system of claim 11 further comprising a caliper for proportionately transferring a measurement of the features to a working surface of the artwork.

13. The system of claim 8, further comprising a plurality of columns of equally spaced distance markers arranged in rows on the transparent surface.

14. A method of creating a proportionately accurate rendition of a subject in an artwork comprising:

viewing the subject through a transparent surface having a grid comprising a series of equally spaced vertical lines and a series of equally spaced horizontal lines for measuring a feature of the subject;

measuring a dimension of a feature of interest of the subject with the vertical or horizontal lines; and proportionately transferring the measured dimension of the feature to a working surface of the artwork by converting the measured dimension to a proportionately larger or smaller dimension using a set of rulers, separate from the transparent surface, each ruler comprising a set of distance markers, the distance between adjacent markers in a single set being equal.

15. The method of claim 14 wherein the transparent surface further comprises a plumb indicator line and the method further comprises viewing the subject through the transparent surface with the plumb indicator line in a substantially horizontal or vertical orientation with respect to a first feature of the subject, observing the relative horizontal or vertical location of a second feature of the subject and transferring the second feature to the working surface of the artwork at the observed relative position from the first feature.

16. The method of claim 14 wherein the converting further comprises opening prongs of a caliper to a distance measured on the ruler corresponding to the distance measured on the grid.

17. The method of claim 14 further comprising using a measurement of a first feature of the subject as a base measurement for measuring the size and position of other features of the subject.

18. The method of claim 14, further comprising removably attaching the ruler to the working surface of the artwork.

* * * * *